United States Patent
Niemela

(10) Patent No.: US 9,672,356 B2
(45) Date of Patent: Jun. 6, 2017

(54) DETERMINING MALWARE STATUS OF FILE

(71) Applicant: F-Secure Corporation, Helsinki (FI)

(72) Inventor: Jarno Niemela, Kirkkonummi (FI)

(73) Assignee: F-Secure Corporation, Helsinki (FI)

( * ) Notice: Subject to any disclaimer, the term of this patent is extended or adjusted under 35 U.S.C. 154(b) by 102 days.

(21) Appl. No.: 14/926,067

(22) Filed: Oct. 29, 2015

(65) Prior Publication Data

US 2016/0125183 A1    May 5, 2016

(30) Foreign Application Priority Data

Nov. 5, 2014    (GB) .................................. 1419707.3

(51) Int. Cl.
  *G06F 7/04*        (2006.01)
  *G06F 21/56*       (2013.01)

(52) U.S. Cl.
  CPC ...... *G06F 21/561* (2013.01); *G06F 2221/034* (2013.01)

(58) Field of Classification Search
  CPC ......... G06F 21/56; G06F 21/561; H04L 63/14
  USPC .......................................................... 726/4
  See application file for complete search history.

(56) References Cited

U.S. PATENT DOCUMENTS

| | | | |
|---|---|---|---|
| 8,001,603 B1 | 8/2011 | Kennedy | 726/24 |
| 8,561,195 B1 | 10/2013 | Chen et al. | 726/24 |
| 8,914,889 B2 * | 12/2014 | Niemela | G06F 21/563 726/22 |
| 2003/0120952 A1 * | 6/2003 | Tarbotton | G06F 21/564 726/4 |
| 2005/0021994 A1 * | 1/2005 | Barton | G06F 21/562 726/26 |
| 2005/0080816 A1 * | 4/2005 | Shipp | G06F 21/562 |
| 2006/0080656 A1 * | 4/2006 | Cain | G06F 8/65 717/174 |
| 2009/0019547 A1 * | 1/2009 | Palliyil | G06F 21/566 726/25 |
| 2009/0083852 A1 | 3/2009 | Kuo et al. | 726/22 |
| 2011/0067109 A1 * | 3/2011 | Costea | G06F 21/564 726/24 |
| 2011/0179491 A1 | 7/2011 | Spurlock et al. | 726/24 |
| 2012/0151586 A1 * | 6/2012 | Hentunen | G06F 21/563 726/24 |

(Continued)

FOREIGN PATENT DOCUMENTS

CN    102811213 A    12/2012

OTHER PUBLICATIONS

Haining et al, Management Policies for Non-Volatile Write Caches, IEEE, 1999, pp. 321-328.*

(Continued)

*Primary Examiner* — Luu Pham
*Assistant Examiner* — Jenise Jackson
(74) *Attorney, Agent, or Firm* — Harrington & Smith

(57) ABSTRACT

Determining malware status of a file is disclosed. An apparatus obtains information about an unknown target file, obtains system context of the unknown target file, and determines the unknown target file as clean if the system context matches with one or more predetermined conditions indicative of cleanliness. The predetermined conditions of cleanliness include at least the target file being located in a directory which contains other clean files.

17 Claims, 2 Drawing Sheets

(56) References Cited

U.S. PATENT DOCUMENTS

Figure 1:
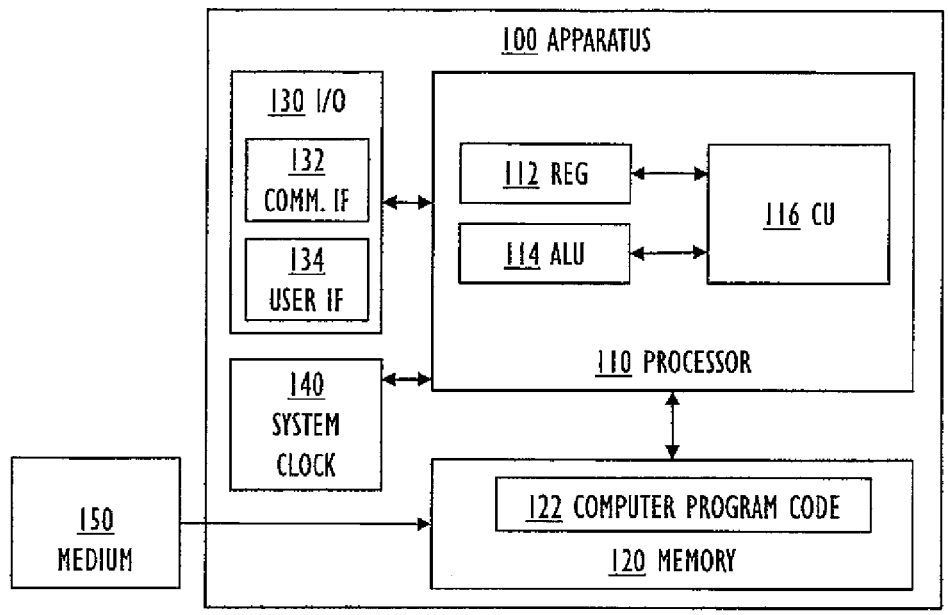

2015/0007327 A1* 1/2015 Morris ................ G06F 21/577
726/24

OTHER PUBLICATIONS

Qiu et al, NVMFS: A Hybrid File System for Improving Random Write in NAND-Flash SSD, IEEE, 2013, pp. 1-5.*

* cited by examiner

DETERMINING MALWARE STATUS OF FILE

FIELD

The invention relates to determining a malware status of a file.

BACKGROUND

Computer use such as surfing the Internet may be hazardous as criminals have infested it by malicious software (malware). Antivirus control is crucial in avoiding damage caused by the malware. However, antivirus software may produce false alarms. Consequently, further sophistication of the antivirus software is desirable. The present application deals especially with worms (=a self-replicating stand-alone malware computer program) and Trojans (=a non-self-replicating stand-alone malware computer program), but not with viruses (=a non-self-replicating non-stand-alone malware computer program, which replicates itself by inserting a copy of itself into another computer program, data file or boot sector of a hard drive, for example)

BRIEF DESCRIPTION

According to an aspect of the present invention, there is provided an apparatus comprising: one or more processors; and one or more memories including computer program code; the one or more memories and the computer program code configured to, with the one or more processors, cause the apparatus at least to: obtain information about an unknown target file; obtain system context of the unknown target file, the system context defining an environment where the target file is stored; and determine the unknown target file as clean if the system context matches with one or more predetermined conditions indicative of cleanliness, the predetermined conditions of cleanliness comprising at least the target file being located in a directory which contains other clean files.

According to another aspect of the present invention, there is provided a method comprising: obtaining information about an unknown target file; obtaining system context of the unknown target file, the system context defining an environment where the target file is stored; and determining the unknown target file as clean if the system context matches with one or more predetermined conditions indicative of cleanliness, the predetermined conditions of cleanliness comprising at least the target file being located in a directory which contains other clean files.

According to another aspect of the present invention, there is provided a non-transitory computer-readable medium comprising computer program code which, when loaded into an apparatus causes the apparatus at least to: obtain information about an unknown target file; obtain system context of the unknown target file, the system context defining an environment where the target file is stored; and determine the unknown target file as clean if the system context matches with one or more predetermined conditions indicative of cleanliness, the predetermined conditions of cleanliness comprising at least the target file being located in a directory which contains other clean files.

LIST OF DRAWINGS

Figure 2:
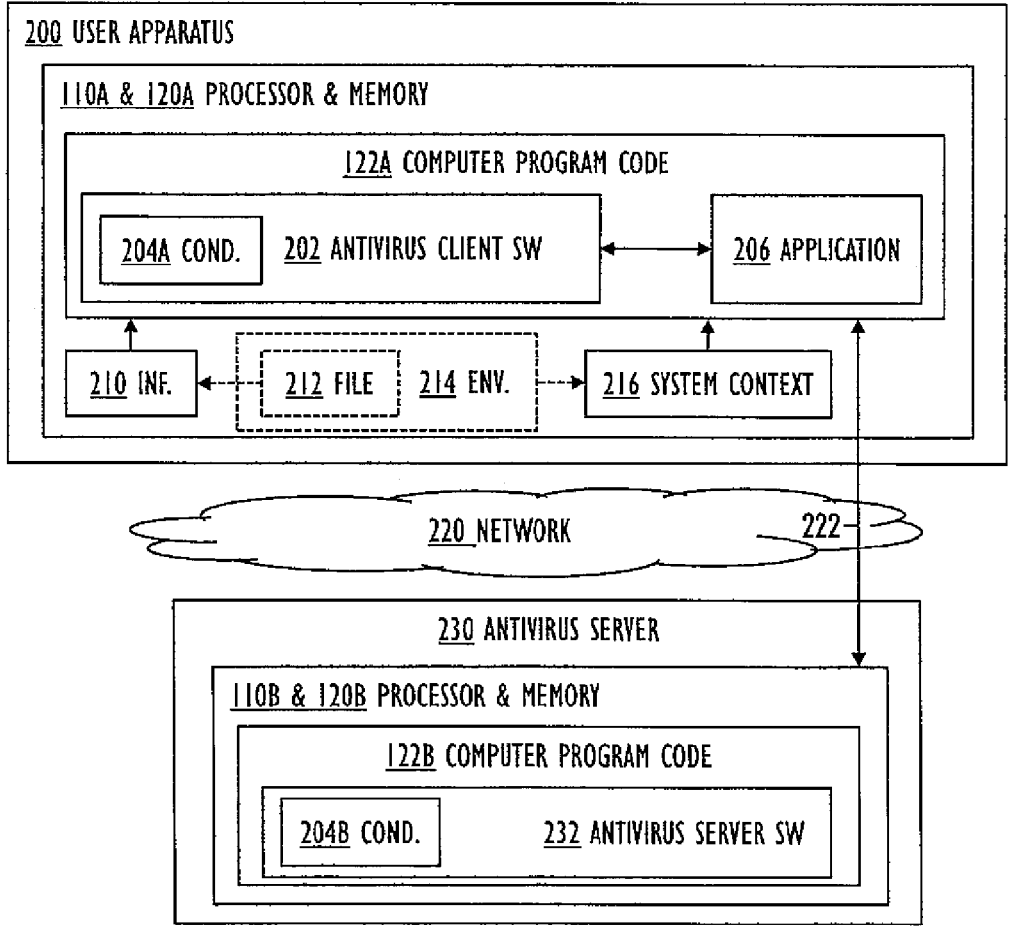
Figure 3:
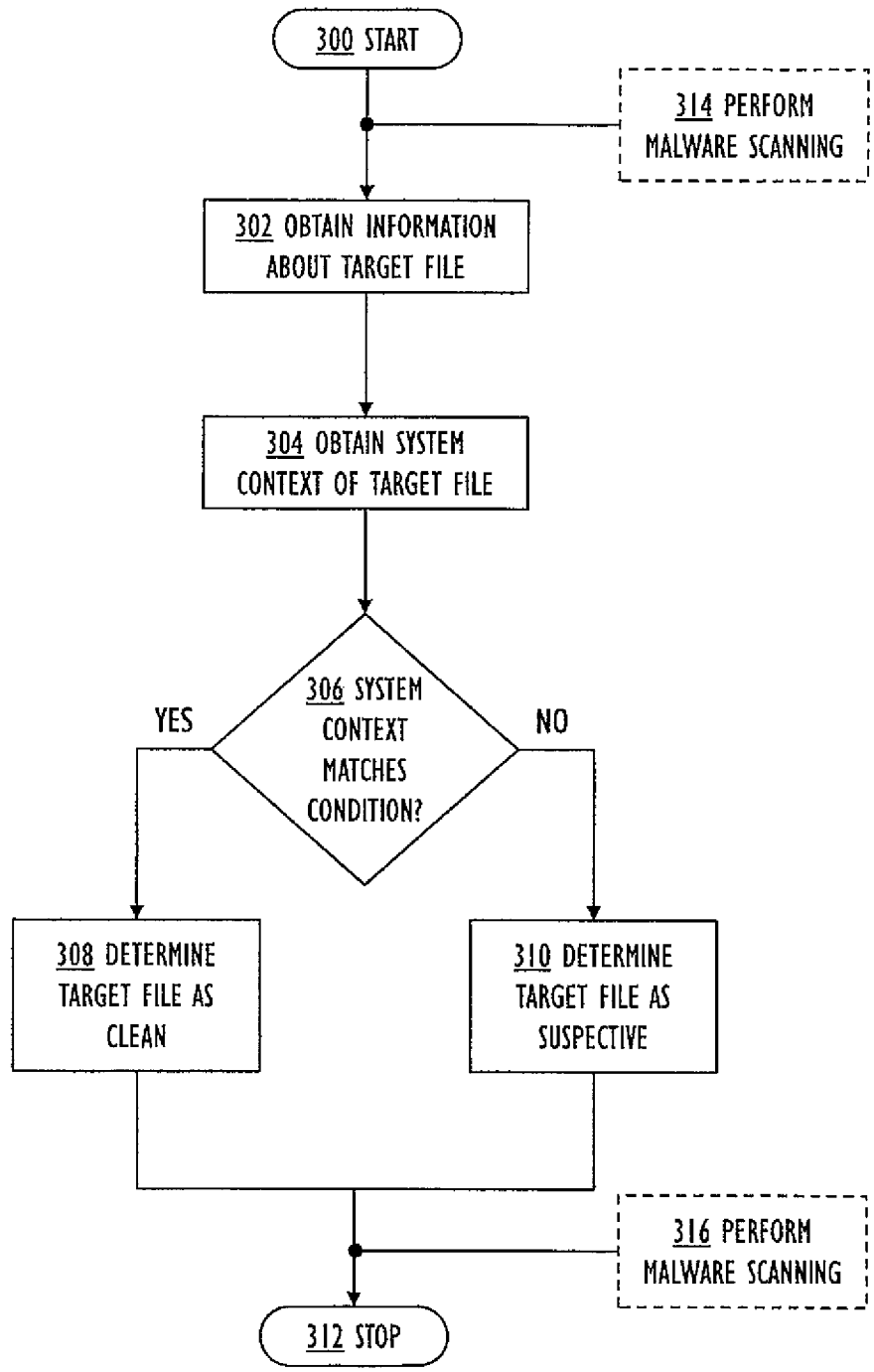

Example embodiments of the present invention are described below, by way of example only, with reference to the accompanying drawings, in which FIG. 1 illustrates example embodiments of an apparatus;

FIG. 2 illustrates example embodiments of a user apparatus and an antivirus server; and FIG. 3 is a flow chart illustrating example embodiments of a method.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments of apparatuses, they are simplified block diagrams that only show some structures and functional entities. The connections shown in these Figures are logical connections; the actual physical connections may be different. Interfaces between the various elements may be implemented with suitable interface technologies, such as a message interface, a method interface, a sub-routine call interface, a block interface, or any hardware/software means enabling communication between functional sub-units. It is apparent to a person skilled in the art that the described apparatuses may also comprise other functions and structures. It should be appreciated that details of some functions, structures, and the protocols used for communication are irrelevant to the actual invention. Therefore, they need not be discussed in more detail here. Although the apparatuses have been depicted as separate single entities, different parts may be implemented in one or more physical or logical entities.

FIG. 1 illustrates an example embodiment of an apparatus 100. The apparatus 100 may be any electronic apparatus capable of processing data. A non-exhaustive list of the types of the apparatus 100 includes: an electronic digital computer, a desktop computer, a portable computer, a laptop computer, a tablet computer, a phablet, a smartphone, a mobile phone, a server computer, a computing resource, a part of a computing cloud, or any other electronic apparatus requiring determining malware status of a file.

The apparatus 100 comprises one or more processors 110 and one or more memories 120 including computer program code 122. The processor 110 and the memory 120 may be implemented by electronic circuitry.

The term 'processor' 110 refers to a physical device that is capable of processing data in a computer or other digital electronic device. Depending on the processing power needed, the apparatus 100 may comprise several processors 110 such as parallel processors or one or more multicore processors. When designing the implementation of the processor 110, a person skilled in the art will consider the requirements set for the size and power consumption of the apparatus 100, the necessary processing capacity, production costs, and production volumes, for example.

The term 'memory' 120 refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a magnetic computer storage device such as a hard disk drive, an optical disc, suitable semiconductor, or any other means of implementing an electrical computer memory.

In an example embodiment, a system clock 140 constantly generates a stream of electrical pulses, which cause the various transferring operations within the apparatus 100 to take place in an orderly manner and with specific timing.

In an example embodiment, the processor 110 may be implemented as a microprocessor implementing functions of a central processing unit (CPU) on an integrated circuit. The CPU is a logic machine executing computer program code 122. The computer program code 122 may be coded as a computer program using a programming language, which may be a high-level programming language, such as C, C++ or Java, for example, or a low-level programming language, such as a machine language, or an assembler. The CPU may comprise a set of registers 112, an arithmetic logic unit (ALU) 114, and a control unit (CU) 116. The control unit 116 is controlled by a sequence of the computer program code 122 transferred to the CPU from the (working) memory 120. The control unit 116 may contain a number of microinstructions for basic operations. The implementation of the microinstructions may vary, depending on the CPU design. The microprocessor 110 may also have an operating system (a dedicated operating system of an embedded system, a so real-time operating system, or a general-purpose operating system), which may provide the computer program code 122 with system services.

A non-exhaustive list of implementation techniques for the processor 110 and the memory 120 includes, but is not limited to: logic components, standard integrated circuits, application-specific integrated circuits (ASIC), system-on-a-chip (SoC), application-specific standard products (ASSP), microprocessors, microcontrollers, digital signal processors, special-purpose computer chips, field-programmable gate arrays (FPGA), and other suitable electronics structures.

The computer program code 122 may be implemented by software. In an example embodiment, the software may be written by a suitable programming language, and the resulting executable code 122 may be stored on the memory 120 and run by the processor 110.

An example embodiment provides a computer-readable medium 150 for the apparatus 100 comprising a computer program comprising the computer program code 122. Said computer program code 122, when loaded into the apparatus 100 and executed in the apparatus 100, causes the apparatus 100 to obtain information about a target file, obtain system context of the target file, the system context defining an environment where the target file is stored, determine the target file as clean if the system context matches with at least one predetermined condition indicative of cleanliness. The computer program code 122 may also perform the operations required to implement the described other example embodiments. In an example embodiment, the computer program code 122 may be in source code form, object code form, executable file, or in some intermediate form. The computer-readable medium 150 may comprise at least the following: any entity or device capable of carrying computer program code 122 to the apparatus 100, a record medium, a computer memory, a read-only memory, an electrical carrier signal, a telecommunications signal, and a software distribution medium. In some jurisdictions, depending on the legislation and the patent practice, the computer-readable medium 150 may not be the telecommunications signal. In an example embodiment, the computer-readable medium 150 may be a non-transitory computer readable storage medium.

In an example embodiment, the apparatus 100 further comprises an input/output 130 including a communication interface 132 and a user interface, for example.

In an example embodiment, the communication interface 132 comprises a network interface card and/or a wireless transceiver.

In an example embodiment, the user interface 134 implements the exchange of graphical, textual and auditory information with a user. The user interface 134 may be realized with various techniques, such as a display, means for producing sound, a keyboard, and/or a keypad, for example. The display may be a liquid crystal display, for example, but it may also be implemented by any appropriate technique, such as with an active-matrix organic light-emitting diode. The display may also incorporate other user interaction means, such as touch input, or haptic feedback, i.e. the display may be a multi-touch display. The means for producing sound may be a loudspeaker or a simpler means for producing beeps or other sound signals. The keyboard/keypad may comprise a complete (QWERTY) keyboard, a mere numeric keypad or only a few push buttons and/or rotary buttons. In addition, the user interface 134 may comprise other user interface components, for example various means for focusing a cursor (mouse, track ball, arrow keys, touch sensitive area etc.) or elements enabling audio control.

Naturally, the apparatus 100 may include various other parts, such as a battery, a camera, a radio-frequency identifier reader, a positioning receiver, but as they are not needed to further illustrate the example embodiments, they will not be further described.

As illustrated in FIG. 1, the apparatus 100 may be an independent device. However, the apparatus 100 functionality may also be implemented in a system of interacting parts. FIG. 2 illustrates an example embodiment of such a system including a user apparatus 200 communicating 222 over a network 220 with an antivirus server 230.

In an example embodiment, the communication network 220 may include various wired/wireless standard/non-standard/proprietary communication networks such as a computer network, a private network, an IP-based network (TCP/IP=Transmission Control Protocol/Internet Protocol), the Internet, the telephone network including the public switched telephone network, any cellular network (such as a mobile phone network), regardless of the generation (such as 2G, 3G, 4G, beyond 4G, etc.) such as GSM (Global System for Mobile Communications), GPRS (General Packet Radio Service), EGPRS (Enhanced GPRS), WCDMA (Wideband Code Division Multiple Access), UMTS (Universal Mobile Telephone System), 3GPP (The 3rd-Generation Partnership Project), IMT (International Mobile Telecommunication), LTE (Long Term Evolution, LTE-A (LTE-Advanced), and other radio systems (in their present forms and/or in their evolution forms), such as WLAN (Wireless Local Area Network) based on IEEE (Institute of Electrical and Electronics Engineers) 802.11 standard or its evolution versions (IEEE 802.11ac etc.), WIMAX (Worldwide Interoperability for Microwave Access, or Wi-Fi, for example.

As illustrated in FIG. 2, the computer program code 122A, 122B may be implemented by suitable software both in the user apparatus 200 and in the antivirus server 230.

In an example embodiment, the computer program code 122A of the user apparatus 200 comprises antivirus client software 202 and application software 206 as separate software entities communicating with each other while run by the processor 110A and the memory 120A. The application software 206 may be a web browser, or any other software application requiring the determination of a malware status of a target file. In an example embodiment, the antivirus client software 202 includes a plug-in that is loaded into the application software 206 for facilitating the mutual communication. In another example embodiment, the antivirus client software 202 comprises a plug-in module for a web browser 206, and the communication is implemented between the plug-in module 202 and the web browser 206. However, alternatively, the antivirus client software 202 and the application 206 functionalities may be combined within a single software entity as well. Consequently, the antivirus client software 202 functionality may be a part of the application software 206.

In an example embodiment, the computer program code 122B of the antivirus server 230 comprises antivirus server software 232 run by the processor 110B and the memory 120B. The antivirus server 230 may operate in an antivirus cloud, which refers to antivirus software operating in a cloud computing environment for prevention, detection, and removal of malware, whereby shared resources, software, and information are provided to the antivirus client software 202 of the user apparatus 200 as a utility over the network 220. Naturally, the antivirus server 230 may be implemented according to the more traditional client-server computing model as well.

The antivirus server 230 is a part of the client-server computing model that acts as distributed application which partitions tasks or workloads between the provider of a resource or service, called server 230, and the service requester, called client 200. The server computer 230 is a host that is running one or more server programs which share their resources with clients 200. The client 200 may request a server's content or service function. The client 200 therefore initiates a communication session with the server 230 which awaits incoming requests. The server 230 may also operate according to the cloud computing model. Additionally, or alternatively, the server may also operate according to the peer-to-peer (P2P) computing model. A pure peer-to-peer system consists of equal peer nodes that simultaneously function as both clients 200 and servers 230. In a hybrid peer-to-peer system, a need for a special role is recognized: one or several nodes, but not all nodes, have a special role, which serves the other nodes of the peer-to-peer system. In FIG. 2, the server 230 may have the special role serving the client 200. Additionally, the client 200 may also serve as a server to another client.

Naturally, the described distribution of functionality between the user apparatus 200 and the antivirus server 230 is just one example embodiment, as the distribution may be adjusted based on the system requirements.

The one or more memories 120 (120A and/or 120B) and the computer program code 122 (122A and/or 122B) are configured to, with the one or more processors 110 (110A and/or 110B), cause the apparatus 100 (200 and/or 230) to obtain information 210 about a target file 212, obtain system context 216 of the target file 212, and determine the target file 212 as clean if the system context 216 matches with at least one predetermined condition 204A, 204B indicative of cleanliness.

The system context 216 defines an environment 214 where the target file 212 is stored. In an example embodiment, the environment 214 where the target file 212 is stored is in the memory 110A of the user apparatus 200 or in a memory accessible with the user apparatus 200 such as in an accessory of the user apparatus 200 or in a service accessed by the user apparatus 200.

The predetermined condition 204A, 204B indicative of the cleanliness may be a rule, formula, condition clause or any other way of expressing a condition which may be compared with the system context 216 in order to find out whether the predetermined condition 204A, 204B is met or not met.

In an example embodiment, if the target file 212 is determined as clean, it means that the malware status of the target file 210 is safe. In an example embodiment, possible determinations comprise: suspicious, clean/safe, malicious/not safe.

In an example embodiment, the one or more memories 120 (120A and/or 120B) and the computer program code 122 (122A and/or 122B) are further configured to, with the one or more processors 110 (110A and/or 110B), cause the apparatus 100 (200 and/or 230) further to determine the target file 212 as suspicious if the system context 216 does not match with the at least one predetermined condition 204A, 204B indicative of the cleanliness.

Current antivirus engines and behavioural detection methods may produce false alarms. An individual target file 212 when inspected out of its context may indeed look suspicious, especially for automatic analysis systems. But when inspected in the scope of a system where this target file 212 is a part of a software installation, the false alarm may be detected. The described solution uses the system context in determining malware status of the target file 212: whether the target file 212 is a false alarm or legitimate malware detection, for example.

The described solution may be utilized to enhance the operation of the malware detection systems, which perform the analysis based on the properties of the target file 212 itself, i.e., not based on the system context 216 of its environment 214.

In an example embodiment, the one or more memories 120 (120A and/or 120B) and the computer program code 122 (122A and/or 122B) are further configured to, with the one or more processors 110 (110A and/or 110B), cause the apparatus 100 (200 and/or 230) further to, prior to determining the target file 212 as clean, perform malware scanning for the target file 212 to determine whether properties of the target file 212 indicate malware infection.

In an example embodiment, the one or more memories 120 (120A and/or 120B) and the computer program code 122 (122A and/or 122B) are further configured to, with the one or more processors 110 (110A and/or 110B), cause the apparatus 100 (200 and/or 230) further to, after determining the target file 212 as clean, perform malware scanning for the target file 212 to determine whether properties of the target file 212 indicate malware infection.

Next, let us study further example embodiments explaining various ways for the system context 216 to match with the at least one predetermined condition 204A, 204B.

In an example embodiment, the system context 216 matches with the at least one predetermined condition 204A, 204B indicative of the cleanliness if the target file 212 is running under permission of a user but the target file 212 is located in a directory to which the user does not have a write access. This example embodiment may further be augmented by an example embodiment, wherein the system context 216 matches with the at least one predetermined condition 204A, 204B indicative of the cleanliness if, additionally, the user does not have administrator privileges to grant privilege escalation for the target file 212. These two example embodiments may still be enhanced by an example embodiment, wherein the system context 216 matches with the at least one predetermined condition 204A, 204B indicative of the cleanliness if, additionally, the system context 216 is configured such that granting of a privilege escalation requires the user to enter a password.

In these example embodiments, system security configuration is used as an indication of a possible malware infection of the target file 212. The modern malware rarely gets written into a location where the user does not have write permission. This is due to low availability of local privilege escalation vulnerabilities in modern operating systems, and requesting of an UAC (User Account Control as security infrastructure in Microsoft Windows operating systems) prompt or other privilege escalation from the user is deemed too noisy by modern malware authors.

Thus by inspecting OS security configuration of a directory and file access rights for the suspected target file 212, it may be determined whether the target file 212 is infected. This is very effective especially in corporate environments where users do not have the rights to grant the privilege escalation, or there is an additional control such as a password verification in the UAC prompt.

If the target file 212 is running under user permissions, but is in a directory where the user does not have write access to the file is very unlikely malware. Especially, if the user does not have administrator privileges so s/he cannot grant privilege escalation for the malware, or the system is configured so that granting privilege escalation (UAC) requires the user to enter a password.

In an example embodiment, the system context 216 matches with the at least one predetermined condition 204A, 204B indicative of the cleanliness if the target file 212 is located in a directory which is filled with other known clean files. In an example embodiment, the other known clean files comprise clean binary files.

With the exception of %APPDATA% and %TEMP%, malware very rarely is able to drop itself into a location in which the user has clean binaries. This is especially so in properly configured corporate environments. Thus the write permission checking may be combined with reputation check of the other binaries. If the target file 212 is in a place where the user cannot write and the location has clean files, the file 212 is very likely clean. Also, in a case where the user could write into the location, the presence of the clean files is still indication of a false alarm, although not as strong.

In an example embodiment, the system context 216 matches with the at least one predetermined condition 204A, 204B indicative of the cleanliness if the target file 212 is linked with known clean binary files of a dynamic-link library. In an example embodiment, the system context 216 matches with the at least one predetermined condition 204A, 204B indicative of the cleanliness if, additionally, the target file 212 is located in the same directory as the known clean binary files of the dynamic-link library (DLL).

Imports and exports of DLL linking may give valuable information about the malware status of the target file 212. If the target file 212 exports functions that are imported by known clean binaries, the target file 212 is very likely clean. Especially so if the clean binaries linking to the target file 212 are not system or runtime files, as this is a strong indication that the target file 212 is a part of the same installation as those clean files. This verification may be enhanced by keeping track which clean files are frequently seen together and thus spot cases where malware is transporting some clean files just to hide by the association. Also the fact that the target file 212 is linking functions exported by known clean binaries is indication of cleanliness, as long as those binaries are not runtime or system components. In an example embodiment, the target file 212, which is in a directory with clean files, and which imports functions from those clean files, is very likely clean. Especially so if the directory where the target file 212 and the clean files are located is the common location for those clean files.

In an example embodiment, the system context 216 matches with the at least one predetermined condition 204A, 204B indicative of the cleanliness if the target file 212 is located in a directory pointed by uninstall information of the environment 214 or in a subdirectory of the directory. In an example embodiment, the system context 216 matches with the at least one predetermined condition 204A, 204B indicative of the cleanliness if, additionally, the uninstall information comprises a reference to a name of the target file 212.

If the target file 212 is in a directory pointed by Windows uninstall information, the target file 212 is unlikely malware. This may be verified by iterating through HKEY_LOCAL_MACHINE\SOFTWARE\Microsoft\Windows\CurrentVersion\Uninstall and other registry locations, which contain uninstall information shown in the control panel. This check may be strengthened by checking whether uninstall information listed in the uninstall registry tree contains string references to a file name of the target file 212.

In an example embodiment, the system context matches 216 with the at least one predetermined condition 204A, 204B indicative of the cleanliness if a fuzzy hash calculated from the target file 212 matches with a locally stored fuzzy hash calculated previously from a known clean file. In an example embodiment, the system context 216 matches with the at least one predetermined condition 204A, 204B indicative of the cleanliness if, additionally, the target file 212 is stored in the same directory as the known clean file. In an example embodiment, the system context 216 matches with the at least one predetermined condition 204A, 204B indicative of the cleanliness if, additionally, the target file 212 is stored by a same process as the known clean file was previously stored.

The use of the fuzzy hashes to match against known clean files in order to find whether an unknown file is a new version of an existing file is a well-known technique. But the problem with fuzzy hashes is that they are not very useful for online reputation check since matching them is very slow, or requires very large indexes from backend database. But the problem may be circumvented by calculating fuzzy hashes from local known clean files, and maintain history data of those hashes. And when a new file appears on the system, it may be verified whether the file is a new version of an already known clean file.

Especially as the new version of the known clean file is most likely going to have identical path information to the previous version. Thus if the fuzzy hash check produces a high match score and its location is identical, the file is almost certainly clean. Especially if it has been written to the disk by the same process as the previous file was.

In an example embodiment, the system context 216 matches with the at least one predetermined condition 204A, 204B indicative of the cleanliness if the target file 212 has been installed from an installation package of an application or a patch package of the application, and the application is known to be clean. In an example embodiment, the system context 216 matches with the at least one predetermined condition 204A, 204B indicative of the cleanliness if, additionally, the target file 212 has been installed from the installation package and is not modified.

In Microsoft Windows operating systems, installation package is also known as MSI, and the patch package as MSP. If the file has been installed from an MSI or MSP package, it is checked if the MSI has uninstall information and what is the reputation of said MSI. It is also checked if the target file 212 has been modified, as files installed from the MSI installation package are supposed to be static.

In an example embodiment, the system context 216 matches with the at least one predetermined condition 204A, 204B indicative of the cleanliness if the target file 212 is located in a directory pointed by a linker file in a desktop or a start menu of the environment.

In Microsoft Windows operating systems the linker file is also known as LNK file, which is a shortcut file including a pointer to an .EXE file located somewhere in the environment 214. It may be checked whether target file 212 is located in a directory pointed by some LNK file (icon) in user's Desktop or Start Menu (note: skip Startup folder as that is used by malware).

In an example embodiment, the system context 216 matches with the at least one predetermined condition 204A, 204B indicative of the cleanliness if the target file 212 is located in a directory having a matching name pair in the environment 214 with a directory storing application-related data.

In Microsoft Windows operating systems, it may be checked whether the directory has a matching name pair in %PROGRAM_DATA% or %APPDATA%. For example: c:\program files\Skype has a counterpart pair in c:\program data\Skype and %appdata%\Skype.

Next, let us study FIG. 3, which is a flow chart illustrating example embodiments of a method. The operations are not strictly in chronological order, and some of the operations may be performed simultaneously or in an order differing from the given ones. Other functions may also be executed between the operations or within the operations and other data exchanged between the operations. Some of the operations or part of the operations may also be left out or replaced by a corresponding operation or part of the operation. It should be noted that no special order of operations is required, except where necessary due to the logical requirements for the processing order. In an example embodiment, the method may be implemented by an electronic apparatus, by the described apparatus 100, for example.

The method starts in 300.

In 302, information about a target file is obtained.

In 304, system context of the target file is obtained, the system context defining an environment where the target file is stored.

In 308, the target file is determined as clean if the system context matches 306 YES with at least one predetermined condition indicative of cleanliness.

The method ends in 312.

The already described example embodiments of the apparatus 100 may be utilized to enhance the method with various further example embodiments. Some of these are described in FIG. 3.

In an example embodiment, the method further comprises: determining the target file as suspicious in 310 if the system context does not match 306 NO with the at least one predetermined condition indicative of the cleanliness.

In an example embodiment, the method further comprises: prior to determining the target file as clean in 308, performing malware scanning for the target file in 314 to determine whether properties of the target file indicate malware infection.

In an example embodiment, the method further comprises: after determining the target file as clean in 308, performing malware scanning for the target file in 316 to determine whether properties of the target file indicate malware infection.

The operations and the supplementary operations may be repeated 302-304-306-308/310 as required.

It will be obvious to a person skilled in the art that, as technology advances, the inventive concept can be implemented in various ways. The invention and its embodiments are not limited to the example embodiments described above but may vary within the scope of the claims.

The invention claimed is:

1. An apparatus for determining malware status of a target file, the apparatus comprising:
   one or more processors; and
   one or more memories for storing computer program code that, when executed by the one or more processors, causes the one or more processor to:
   obtain information associated with a target file;
   obtain system context of the target file, the system context defining an environment where the target file is stored;
   retrieve one or more predetermined conditions specifying cleanliness of the target file;
   verify if the system context matches with the one or more predetermined conditions, wherein
   the one or more predetermined conditions include at least one of:
   the target file being located in a directory which contains other clean files;
   the target file is accessed or executed by a user while the target file is located in a directory to which the user does not have a write access, wherein the user not having administrative privilege to escalate permission for the target file, and
   the target file being located in a directory pointed by a shortcut on a desktop or a start menu of the environment;
   determine that the target file is suspicious in response to system context does not match with the one or more predetermined conditions; and
   perform malware scanning on the target file.

2. The apparatus of claim 1, wherein the one or more memories and the computer program code are further configured to, with the one or more processors, cause the apparatus further to:
   determine the target file as suspicious if the system context does not match with the at least one predetermined condition indicative of the cleanliness.

3. The apparatus of claim 1, wherein the one or more memories and the computer program code are further configured to, with the one or more processors, cause the apparatus further to:
   prior to determining the target file as clean, perform malware scanning for the target file to determine whether properties of the target file indicate malware infection.

4. The apparatus of claim 1, wherein the one or more memories and the computer program code are further configured to, with the one or more processors, cause the apparatus further to:
   after determining the target file as clean, perform malware scanning for the target file to determine whether properties of the target file indicate malware infection.

5. The apparatus of claim 1, wherein the other known clean files comprise clean binary files.

6. The apparatus of claim 1, wherein the predetermined conditions indicative of the cleanliness further comprise the target file being linked with known clean binary files of a dynamic-link library.

7. The apparatus of claim 6, wherein the predetermined conditions indicative of the cleanliness further comprise the target file being located in the same directory as the known clean binary files of the dynamic-link library.

8. The apparatus of claim 1, wherein the predetermined conditions indicative of the cleanliness further comprise the target file being located in a directory pointed by uninstall information of the environment or in a subdirectory of the directory.

9. The apparatus of claim 8, wherein the predetermined conditions indicative of the cleanliness further comprise the uninstall information comprising a reference to a name of the target file.

10. The apparatus of claim 1, wherein the predetermined conditions indicative of the cleanliness further comprise a fuzzy hash calculated from the target file matching with a locally stored fuzzy hash calculated previously from a known clean file.

11. The apparatus of claim 10, wherein the predetermined conditions indicative of the cleanliness further comprise the target file being stored in the same directory as the known clean file.

12. The apparatus of claim 11, wherein the predetermined conditions indicative of the cleanliness further comprise the target file being stored by a same process as the known clean file was previously stored.

13. The apparatus of claim 1, wherein the predetermined conditions indicative of the cleanliness further comprise the target file having been installed from an installation package of an application or a patch package of the application, and the application being known to be clean.

14. The apparatus of claim 13, wherein the predetermined conditions indicative of the cleanliness further comprise the target file having been installed from the installation package and not being modified.

15. The apparatus of claim 1, wherein the predetermined conditions indicative of the cleanliness further comprise the target file being located in a directory having a matching name pair in the environment with a directory storing application-related data.

16. A method for determining malware status of a target file, the method comprising;
obtaining information associated with a target file;
obtaining system context of the target file, the system context defining an environment where the target file is stored;
retrieving one or more predetermined conditions specifying cleanliness of the target file;
verifying if the system context matches with the one or more predetermined conditions, wherein
the one or more predetermined conditions include at least one of:
the target file being located in a directory which contains other clean files;
the target file is accessed or executed by a user while the target file is located in a directory to which the user does not have a write access, wherein the user not having administrative privilege to escalate permission for the target file, and
the target file being located in a directory pointed by a shortcut on a desktop or a start menu of the environment:
determining that the target file is suspicious in response to system context does not match with the one or more predetermined conditions; and
performing malware scanning on the target file.

17. A non-transitory computer-readable medium comprising program code which, when loaded into an apparatus causes the apparatus at least to:
obtain information about a target file;
obtain system context of the target file, the system context defining an environment where the target file is stored; and
retrieve one or more predetermined conditions specifying cleanliness of the target file;
verify if the system context matches with the one or more predetermined conditions, wherein
the one or more predetermined conditions include at least one of:
the target file being located in a directory which contains other clean files;
the target file is accessed or executed by a user while the target file is located in a directory to which the user does not have a write access, wherein the user not having administrative privilege to escalate permission for the target file, and
the target file being located in a directory pointed by a shortcut on a desktop or a start menu of the environment;
determine that the target file is suspicious in response to system context does not match with the one or more predetermined conditions; and
perform malware scanning on the target file.

* * * * *